US010536713B2

(12) United States Patent
Ahn et al.

(10) Patent No.: US 10,536,713 B2
(45) Date of Patent: Jan. 14, 2020

(54) METHOD AND APPARATUS FOR DETERMINING MOTION VECTOR IN VIDEO

(71) Applicant: SAMSUNG ELECTRONICS CO., LTD., Suwon-si (KR)

(72) Inventors: Tae-gyoung Ahn, Yongin-si (KR); Dong-yoon Kim, Suwon-si (KR); Yong-hoon Yu, Yongin-si (KR); Hyung-jun Lim, Seoul (KR); Seong-hoon Choi, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 385 days.

(21) Appl. No.: 15/222,190

(22) Filed: Jul. 28, 2016

(65) Prior Publication Data

US 2017/0150170 A1     May 25, 2017

(30) Foreign Application Priority Data

Nov. 19, 2015   (KR) .......................... 10-2015-0162847

(51) Int. Cl.
*H04N 19/00*     (2014.01)
*H04N 19/513*    (2014.01)

(52) U.S. Cl.
CPC .................................. *H04N 19/521* (2014.11)

(58) Field of Classification Search
CPC ........... H04N 7/00; H04N 19/00; H04N 11/00
See application file for complete search history.

(56) References Cited

U.S. PATENT DOCUMENTS

| | | | | |
|---|---|---|---|---|
| 2007/0268964 | A1* | 11/2007 | Zhao | ............... H04N 19/56 375/240.1 |
| 2007/0279523 | A1 | 12/2007 | Yamauchi | |
| 2008/0253457 | A1* | 10/2008 | Moore | ............... H04N 19/52 375/240.16 |
| 2011/0194025 | A1* | 8/2011 | Chen | ............... H04N 5/145 348/452 |

FOREIGN PATENT DOCUMENTS

WO   2015-009132 A1   1/2015

* cited by examiner

*Primary Examiner* — Maryam A Nasri
(74) *Attorney, Agent, or Firm* — Sughrue Mion, PLLC

(57) ABSTRACT

A video processing method includes generating a first down-sampled block by down-sampling a first block included in a first frame; generating a plurality of second down-sampled blocks by down-sampling a second block included in a second frame; selecting one of the plurality of second down-sampled blocks by comparing the first down-sampled block and each of the plurality of second down-sampled blocks; and determining, based on the first down-sampled block and the one selected second down-sampled block, a motion vector whereby the second block points to the first block, wherein the plurality of second down-sampled blocks are generated using down-sampling methods that are different from each other with respect to samples of the second block.

18 Claims, 10 Drawing Sheets

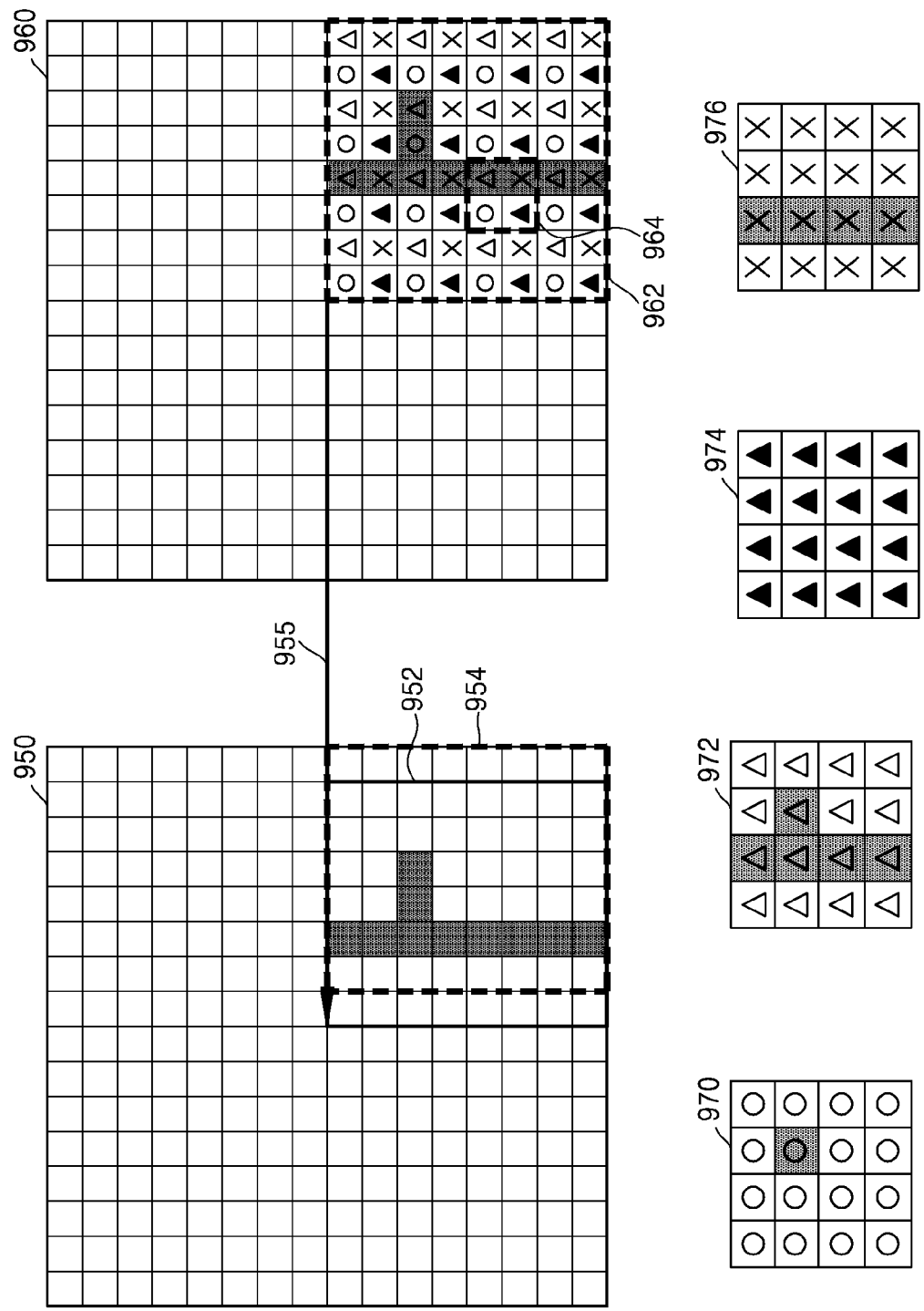

METHOD AND APPARATUS FOR DETERMINING MOTION VECTOR IN VIDEO

CROSS-REFERENCE TO RELATED APPLICATION

This application claims the benefit of Korean Patent Application No. 10-2015-0162847, filed on Nov. 19, 2015, in the Korean Intellectual Property Office, the disclosure of which is incorporated herein in its entirety by reference.

BACKGROUND

1. Field

The present disclosure relates to methods and apparatuses for determining a motion vector in a video including a plurality of frames.

2. Description of the Related Art

A video that is a dynamic image generally includes a plurality of frames that are static images, and based on relationships between the plurality of frames, an efficient compression process may be performed. A motion vector related to a motion of an object included in each frame may be estimated based on relationships between frames different from each other, and a video may be compressed using such a motion vector.

In the related art, a method of rapidly estimating a motion vector in a high-resolution video by down-sampling the video in order to estimate the motion vector and then performing motion estimation has been used. That is, according to the related art, by using hierarchal motion estimation technology, after a current frame and another frame different from the current frame are down-sampled, a motion vector is found in a down-sampled video, and then, the motion vector is scaled up by taking into account a reduced ratio, thereby estimating a motion vector regarding a block of the current frame.

However, when the motion vector in such a down-sampled frame is scaled up, accuracy of the motion vector decreases, and particularly, when such a hierarchal motion vector estimation method of the related art is used in a video having a lot of high-frequency components, an inaccurate result of estimating a motion vector is obtained.

SUMMARY

Provided are video processing methods and video processors for estimating, with a low complexity, an accurate motion vector in a high-frequency area of a video.

Additional aspects will be set forth in part in the description which follows and, in part, will be apparent from the description, or may be learned by practice of the presented embodiments.

According to an aspect of an exemplary embodiment, a video processing method includes: generating a first down-sampled block by down-sampling a first block included in a first frame; generating a plurality of second down-sampled blocks by down-sampling a second block included in a second frame; selecting one of the plurality of second down-sampled blocks by comparing the first down-sampled block and each of the plurality of second down-sampled blocks; and determining, based on the first down-sampled block and the one selected second down-sampled block, a motion vector whereby the second block points to the first block, wherein the plurality of second down-sampled blocks are generated using down-sampling methods that are different from each other with respect to samples of the second block.

The method may further include determining identification information for identifying the plurality of second down-sampled blocks, wherein the determining of the motion vector may include determining, based on identification information of the one selected second down-sampled block, the motion vector.

The identification information may indicate relative coordinates between the plurality of second down-sampled blocks, and the determining of the motion vector may further include determining a motion vector related to a second down-sampled block from among the plurality of second down-sampled blocks, wherein the second down-sampled block may be a criterion of the relative coordinates.

The determining of the motion vector may further include: increasing, based on a down-sampling ratio of the second block, a magnitude of the motion vector related to the second down-sampled block that is the criterion; and refining the increased motion vector by using the identification information of the one selected second down-sampled block.

The determining of the motion vector related to the second down-sampled block that is the criterion may include determining, as the second down-sampled block that is the criterion, a second down-sampled block from among the plurality of second down-sampled blocks that is generated based on a down-sampling method used in a process of generating the first down-sampled block.

The generating of the plurality of second down-sampled blocks may include generating the plurality of second down-sampled blocks by performing down-sampling based on the samples located at different positions from each other in the second block.

The down-sampling may be a method of generating a block having a reduced size in at least one of a widthwise direction and a lengthwise direction.

A number of the down-sampling methods that are used to generate the plurality of second down-sampled blocks may be determined based on a size ratio between the second block and the plurality of second down-sampled blocks.

The one selected second down-sampled block may be determined based on a sum of absolute differences (SAD) that indicates information related to a difference between the first down-sampled block and the plurality of second down-sampled blocks.

According to an aspect of another exemplary embodiment, a video processor includes: a first down-sampled block generator configured to generate a first down-sampled block by down-sampling a first block included in a previous frame that is different from a current frame; a second down-sampled block generator configured to generate a plurality of second down-sampled blocks by down-sampling a second block included in the current frame; and a motion vector determiner configured to select one of the plurality of second down-sampled blocks by comparing the first down-sampled block and each of the plurality of second down-sampled blocks and determine, based on the first down-sampled block and the one selected second down-sampled block, a motion vector whereby the second block points to the first block, wherein the plurality of second down-sampled blocks are generated using down-sampling methods that are different from each other with respect to samples of the second block.

The motion vector determiner may be further configured to determine identification information for identifying the plurality of second down-sampled blocks and determine, based on identification information of the one selected second down-sampled block, the motion vector.

The identification information may indicate relative coordinates between the plurality of second down-sampled blocks, and the motion vector determiner may be further configured to determine a motion vector related to a second down-sampled block from among the plurality of second down-sampled blocks, wherein the second down-sampled block may be a criterion of the relative coordinates.

The motion vector determiner may be further configured to: increase, based on a down-sampling ratio of the second block, a magnitude of the motion vector related to the second down-sampled block that is the criterion; and refine the increased motion vector by using the identification information of the one selected second down-sampled block.

The motion vector determiner may be further configured to determine, as the second down-sampled block that is the criterion, a second down-sampled block from among the plurality of second down-sampled blocks that is generated based on a down-sampling method used in a process of generating the first down-sampled block.

The second down-sampled block generator may be further configured to generate the plurality of second down-sampled blocks by performing down-sampling based on the samples located at positions that are different from each other in the second block.

The down-sampling may be a method of generating a block having a reduced size in at least one of a widthwise direction and a lengthwise direction.

A number of the down-sampling methods that are used to generate the plurality of second down-sampled blocks may be determined based on a size ratio between the second block and the plurality of second down-sampled blocks.

The motion vector determiner may be further configured to determine, based on a sum of absolute differences (SAD) that indicates information related to a difference between the first down-sampled block and the plurality of second down-sampled blocks, the one selected second down-sampled block.

According to an aspect of another exemplary embodiment, there is provided a non-transitory computer-readable recording medium having recorded thereon a program for implementing the video processing method.

BRIEF DESCRIPTION OF THE DRAWINGS

These and/or other aspects will become apparent and more readily appreciated from the following description of the embodiments, taken in conjunction with the accompanying drawings in which:

FIGS. 9A and 9B illustrate a process of determining, based on a second down-sampled block selected by a video processor, a motion vector whereby a second block points to a first block according to an exemplary embodiment.

DETAILED DESCRIPTION

Figure 1:
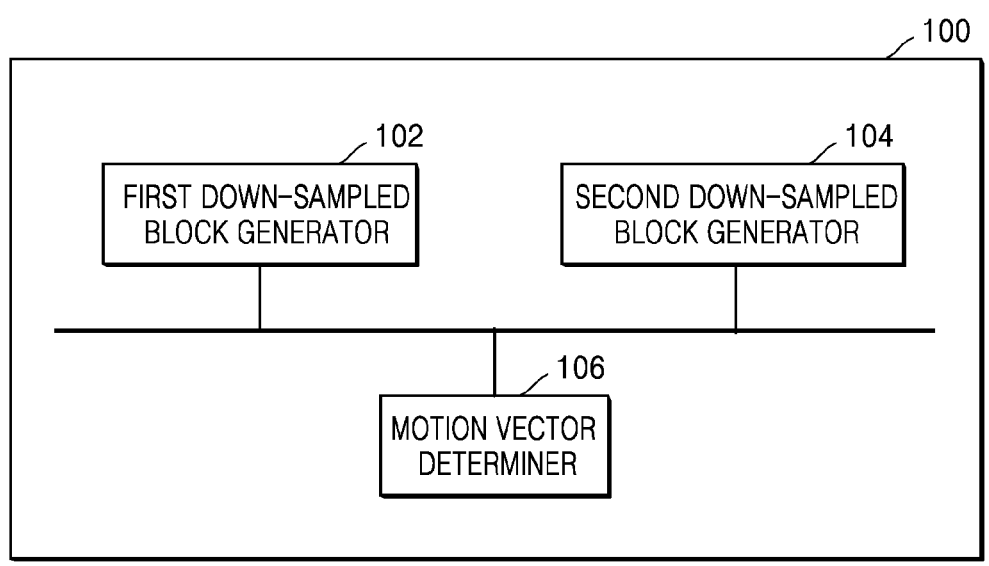
FIG. 1 is a block diagram of a video processor capable of determining a motion vector by generating a plurality of down-sampled blocks in a current frame according to an exemplary embodiment.

Disclosed advantages and features of the present inventive concept and a method of accomplishing the same may be understood more readily by referring to the following description of exemplary embodiments and the accompanying drawings. The inventive concept may, however, be embodied in many different forms and should not be construed as being limited to the exemplary embodiments set forth herein; rather, the present exemplary embodiments are provided so that this disclosure will be thorough and complete and will fully convey the inventive concept to one of ordinary skill in the art, and one or more exemplary embodiments are defined by the scope of claims.

Terms used herein will be briefly described, and then, one or more exemplary embodiments will be described in detail.

The terms used herein are selected from general terms currently widely used while considering functions in one or more exemplary embodiments. However, the terms used herein may differ according to the intention of one of ordinary skill in the art, the precedent, or the advent of new technology. Also, some terms are arbitrarily selected by the present applicant, and in this case, the meaning of those terms will be described in detail herein. Therefore, the terms used herein shall be defined based on the meaning of the terms and content throughout the present specification, rather than simple designations of the terms.

Throughout the present application, when a part "includes" an element, it is to be understood that the part additionally includes other elements rather than excluding other elements as long as there is no particular opposing recitation. Also, the term, such as "unit", "-or", "-er", or the like, used herein refers to a software component, or a hardware component such as FPGA or ASIC, and the "unit", "-or", "-er", or the like performs a certain function. However, the "unit", "-or", "-er", or the like is not limited to software or hardware. The "unit", "-or", "-er", or the like may be configured in an addressable storage medium and may be configured to be executed by one or more processors. Hence, the "unit", "-or", "-er", or the like includes, for example, elements such as software elements, object-oriented software elements, class elements, and task elements, and processes, functions, attributes, procedures, sub-routines, segments of program codes, drivers, firmware, micro-codes, circuits, data, databases, data structures, tables, arrays, and variables. The functions provided in the elements and the "units", "-ors", "-ers", or the like may be combined into a fewer number of elements and "units", "-ors", "-ers", or the like or may be divided into a larger number of elements and "units", "-ors", "-ers", or the like.

Reference will now be made in detail to one or more exemplary embodiments, examples of which are illustrated in the accompanying drawings, so that one of ordinary skill in the art may implement the one or more exemplary embodiments easily. Also, description of parts in the drawings that are not related to one or more exemplary embodiments are omitted to clearly describe the one or more exemplary embodiments. Expressions such as "at least one of," when preceding a list of elements, modify the entire list of elements and do not modify the individual elements of the list.

FIG. 1 is a block diagram of a video processor 100 capable of determining a motion vector by generating a plurality of down-sampled blocks in a current frame according to an exemplary embodiment. According to an exemplary embodiment, the video processor 100 may include a first down-sampled block generator 102, a second down-sampled block generator 104, and a motion vector determiner 106.

Figure 2:
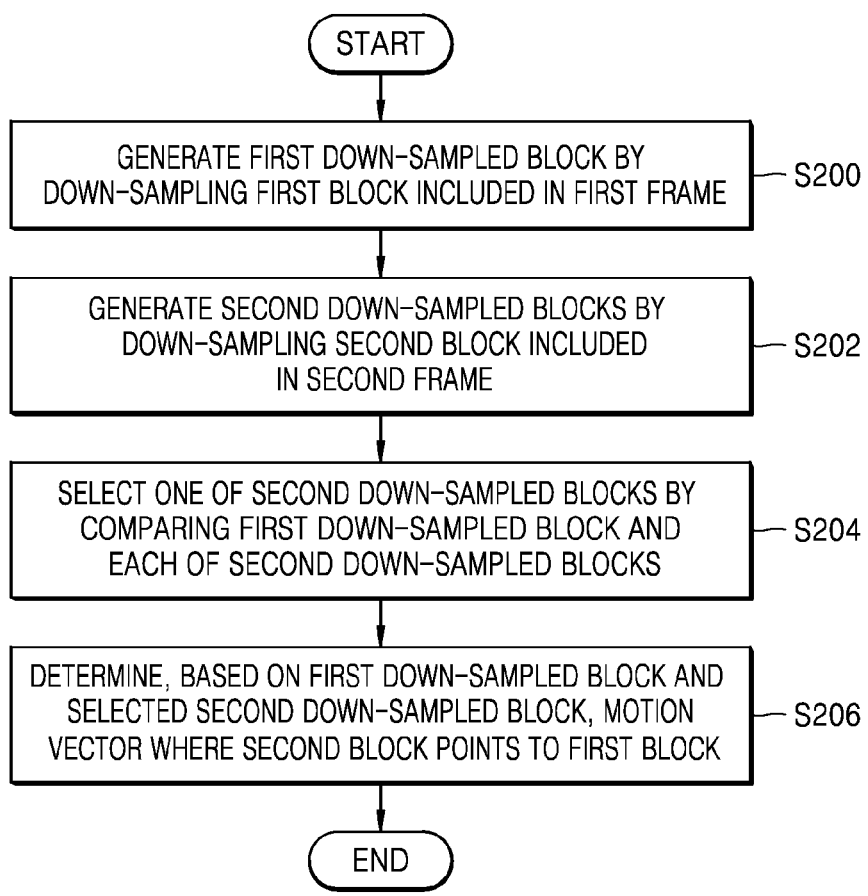
FIG. 2 is a flowchart of a process of determining, by a video processor, a motion vector according to an exemplary embodiment.

FIG. 2 is a flowchart of a process of determining, by the video processor 100, a motion vector according to an exemplary embodiment.

In operation S200, the video processor 100 may generate a first down-sampled block by down-sampled a first block included in a first frame according to an exemplary embodiment.

According to an exemplary embodiment, the video processor 100 may include the first down-sampled block generator 102 capable of generating a first down-sampled block. The first down-sampled block generator 102 may generate the first down-sampled block by down-sampling a first block included in a first frame. A method of down-sampling the first block may vary and should not be construed as being limited to the exemplary embodiments below. The first block included in the first frame may be a block including some samples of the first frame or a block including all samples of the first frame.

Figure 4:
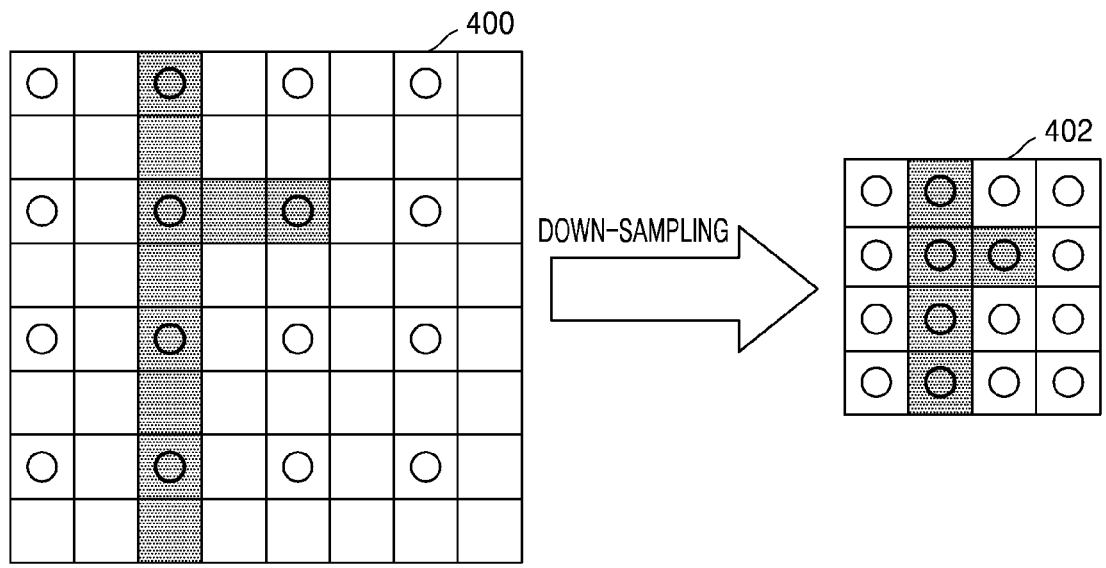
FIG. 4 illustrates a process of generating a down-sampling block by down-sampling a plurality of samples included in a block.
Figure 4:
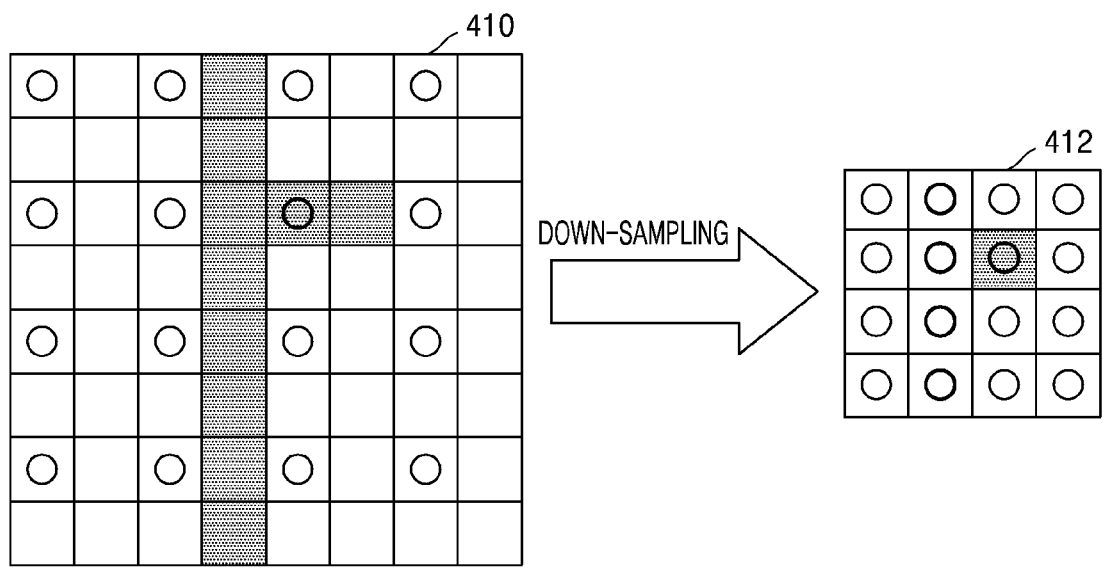

FIG. 4 illustrates a process of generating a down-sampled block by down-sampling a plurality of samples included in a block. According to an exemplary embodiment, the first down-sampled block generator 102 of the video processor 100 may generate a first down-sampled block 402 by down-sampling a first block 400 in a certain manner.

Referring to FIG. 4, according to an exemplary embodiment, the first down-sampled block generator 102 of the video processor 100 may generate the first down-sampled block 402 by performing down-sampling which reduces a size of the first block 400 down to ¼. In detail, the first down-sampled block generator 102 may generate the first down-sampled block 402 that is ¼ the size of the first block 400 by reducing a width and a length of the first block 400 by half. The first down-sampled block generator 102 may generate the first down-sampled block 402 that is ¼ the size of the first block 400 by down-sampling the first block 400 so as to include only one of two samples arranged in a row or column direction of the first block 400.

According to FIG. 4, the first block 400 and a second block 410 include sample values that are similar to each other. However, as the first block 400 and the second block 410 are on different frames from each other, sample positions may be different from each other. For example, a first frame including the first block 400 and a second frame including the second block 410 may be frames including temporally different pieces of information from each other. That is, in a video including a dynamic image, the first frame may be an image generated at a time different from that of the second frame.

Likewise, the first block 400 includes information obtained by capturing an image of the same object as the second block 410, but positions of a plurality of samples indicating the object may be different within the first block 400 and the second block 410. Accordingly, when the first block 400 and the second block 410 are down-sampled in the same manner to generate the first down-sampled block 402 and a second down-sampled block 412, although blocks including information about the same object are down-sampled, different down-sampled blocks may be generated. Particularly, when the captured image includes a lot of high-frequency components, such as in the case where the captured image includes a minutely moving object or a small object, the first down-sampled block 402 and the second down-sampled block 412 generated as a result of down-sampling may include samples arranged in highly different methods.

Motion estimation that is used in a process of coding or decoding a video may be performed by referring to blocks included in different frames from each other, and the referred-to blocks may be blocks included in an original video, and down-sampled blocks may be used to simplify processing. By referring to the first down-sampled block 402 obtained by down-sampling the first block 400 that is an original block, a motion vector whereby the second block 410 points to the first block 400 may be determined, and in this case, by finding a block similar to the second down-sampled block 412 obtained by down-sampling the second block 410, the motion vector may be determined. When the first block 400 and the second block 410 similar to each other have a lot of high-frequency components, the first down-sampled block 402 and the second down-sampled block 412 obtained by down-sampling the first block 400 and the second block 410 may include pieces of information having a relatively great difference, and in this case, efficiency of performing motion estimation may be very low. Referring to FIG. 4, as there is a great difference between the first down-sampled block 402 and the second down-sampled block 412 obtained by performing down-sampling in the same manner, it may be difficult to determine a motion vector of the second block 410 as a vector where the second block 410 points to the first block 400, based on the second down-sampled block 412. Accordingly, a method of down-sampling, by the video processor 100, the second block 410 included in a current frame by using a method different from a down-sampling method of the first block 400, according to various exemplary embodiments, will be described below.

In operation S202, the video processor 100 may generate a plurality of second down-sampled blocks by down-sampling a second block included in a second frame according to an exemplary embodiment. According to an exemplary embodiment, the video processor 100 may include a second down-sampled block generator 104 capable of generating a plurality of second down-sampled blocks by down-sampling a second block. Unlike the first down-sampled block generator 102, the second down-sampled block generator 104 may generate a plurality of second down-sampled blocks by down-sampling one second block. In this regard, the second block included in the second frame may be a block including some samples of the second frame or a block including all samples of the second frame.

Figure 5:
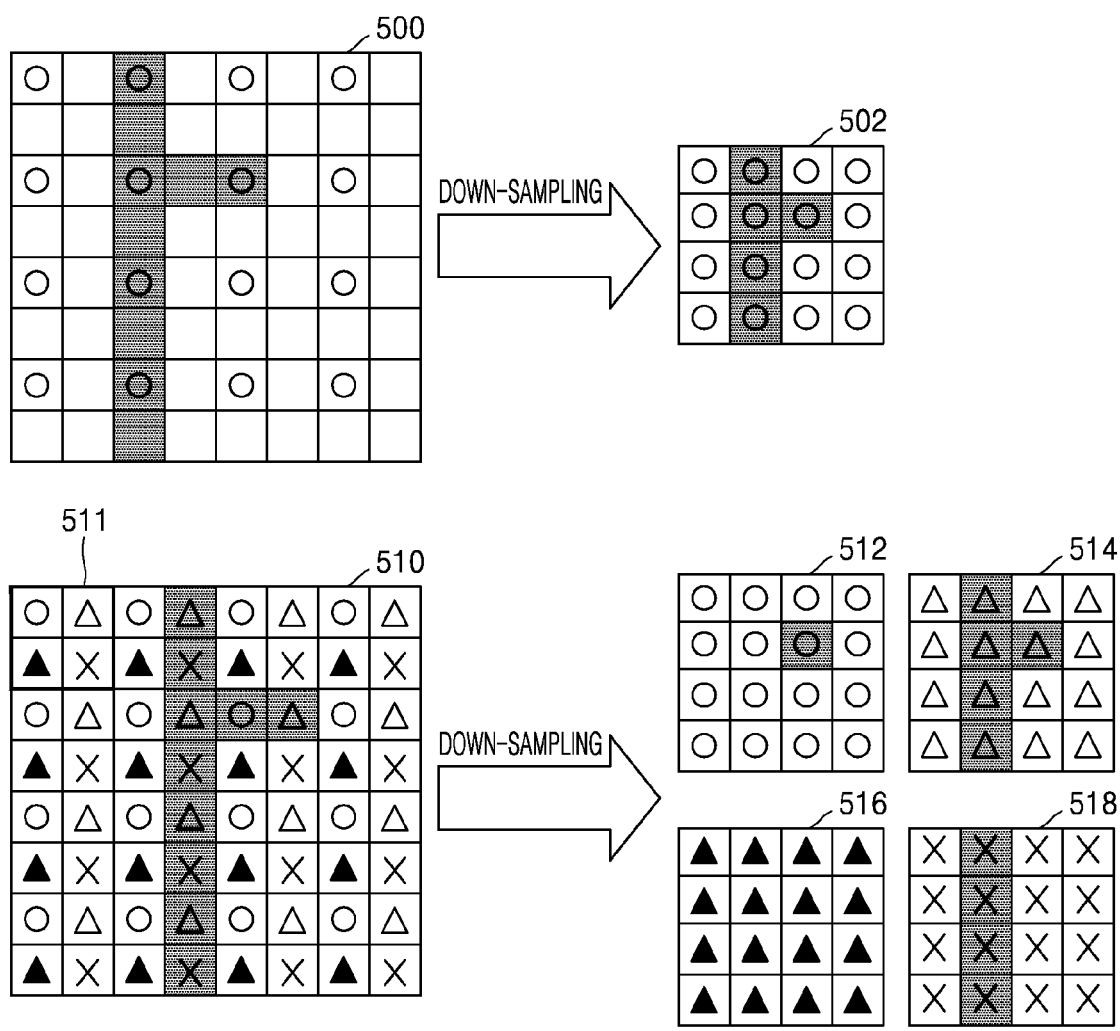
FIG. 5 illustrates a process of generating a first down-sampled block or a second down-sampled block according to an exemplary embodiment.

FIG. 5 illustrates a process of generating a first down-sampled block or a second down-sampled block according to an exemplary embodiment.

Referring to FIG. 5, according to an exemplary embodiment, the first down-sampled block generator 102 of the video processor 100 may generate a first down-sampled block 502 by performing down-sampling which reduces a size of a first block 500 down to ¼. In detail, the first down-sampled block generator 102 may generate the first down-sampled block 502 being ¼ the size of the first block 500 by reducing a width and a length of the first block 500 by half. A down-sampling method for generating the first down-sampled block 502 may vary and should not be construed as being limited to the present exemplary embodiment.

According to an exemplary embodiment, the second down-sampled block generator 104 may generate a plurality of second down-sampled blocks 512, 514, 516 and 518 having various forms by down-sampling a second block 510. Referring to FIG. 5, the second down-sampled block generator 104 may generate a plurality of types of second down-sampled blocks 512, 514, 516 and 518 by down-sampling the second block 510 by using various methods. In this regard, it is assumed for convenience of description that the second block 510 is a block included in a second frame and includes all samples of the second frame.

According to an exemplary embodiment, the second down-sampled block generator 104 may down-sample the second block 510 in order to generate the plurality of second down-sampled blocks 512, 514, 516 and 518, and the down-sampling method may vary. For example, the second down-sampled block generator 104 may generate each of the second down-sampled blocks 512, 514, 516 and 518 that includes one of four samples in each block having a size of 2×2 in the second block 510.

Referring to FIG. 5, a block 511 having a size of 2×2 in the second block 510 may include four samples, and the second down-sampled blocks 512, 514, 516 and 518 may each include one of the four samples of the block 511. For example, the second down-sampled block generator 104 may generate a second down-sampled block 512 including an upper left sample in the block 511, a second down-sampled block 514 including an upper right sample in the block 511, a second down-sampled block 516 including a lower left sample in the block 511, and a second down-sampled block 518 including a lower right sample in the block 511 by down-sampling the second block 510. Likewise, the second down-sampled block generator 104 may generate, based on positions of samples in a block having a size of 2×2 in the second block 510, the second down-sampled blocks 512, 514, 516, and 518 including the samples in their respective positions.

Referring to FIG. 5, the second down-sampled blocks 512, 514, 516, and 518 generated by the second down-sampled block generator 104 may include samples that are different from each other. That is, although the second block 510 that is the same block is down-sampled, the second down-sampled blocks 512, 514, 516, and 518 having various forms may be generated. The second down-sampled block 512 generated by the second down-sampled block generator 104 may be the one generated using a method that is a down-sampling method used in a process of generating, by the first down-sampled block generator 102, the first down-sampled block 502 by down-sampling the first block 500. According to this, similarity between the second down-sampled block 512 and the second block 510 may be greatly decreased as down-sampling is performed. As a result, although the second block 510 is similar to the first block 500, a down-sampled block that is not similar to the first down-sampled block 502 may be generated, and thus, a motion vector whereby the second block 510 points to the first block 500 may be difficult to determine.

On the other hand, the second down-sampled block 514 that is one of second down-sampled blocks 514, 516, and 518 down-sampled in a method different from the down-sampling method of the first down-sampled block 502 may include samples arranged in a similar way to the second block 510. That is, when the second down-sampled block 514 is up-sampled and enlarged thereafter, a block having a similar form to the second block 510 may be generated. When the second down-sampled block 514 as such is used, the motion vector whereby the second block 510 points to the first block 500 may be relatively accurately determined.

Figure 6:
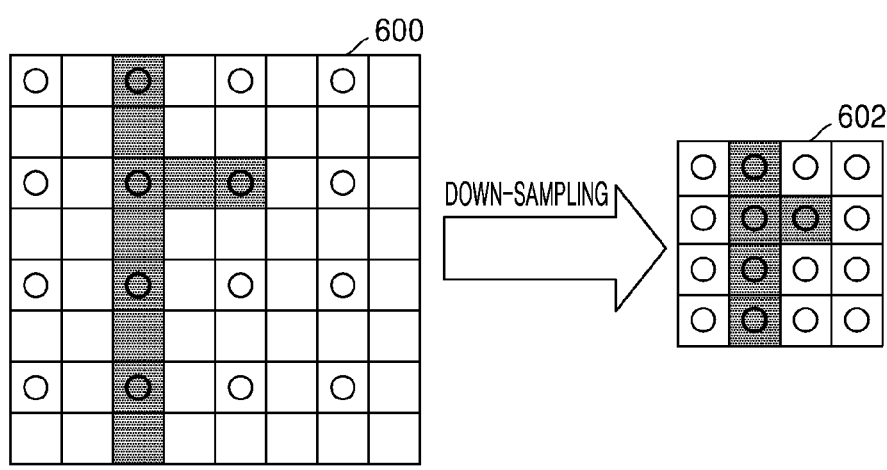
FIG. 6 illustrates a method of performing, by a video processor, down-sampling in order to generate a second down-sampled block according to an exemplary embodiment.
Figure 6:
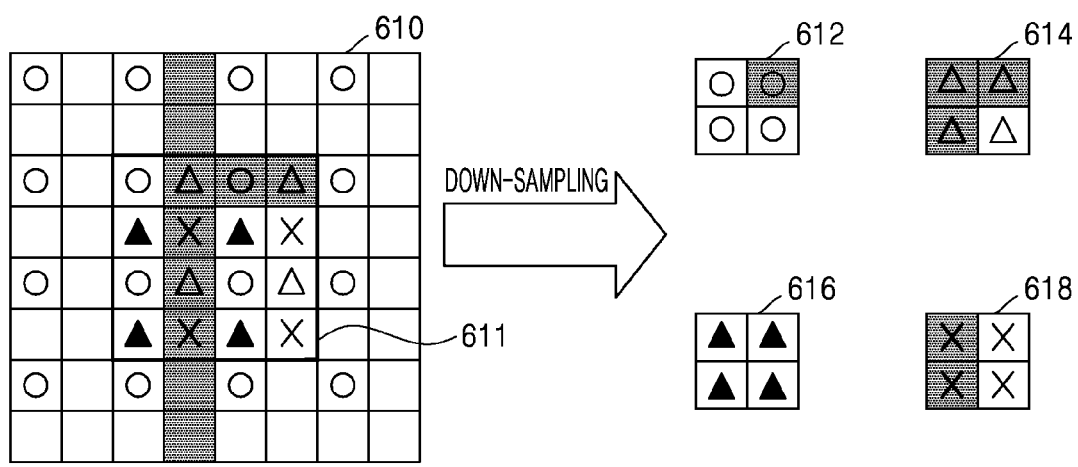

FIG. 6 illustrates a method of performing, by the video processor 100, down-sampling in order to generate a second down-sampled block according to an exemplary embodiment.

According to an exemplary embodiment, a method of generating, by the second down-sampled block generator 104, a plurality of second down-sampled blocks may be various. That is, as shown in FIG. 5, all of the samples included in the second block 510 are down-sampled to generate the second down-sampled blocks 512, 514, 516, and 518, or in addition, as shown in FIG. 6, some of the samples included in the second block 510 are down-sampled to generate the second down-sampled blocks 512, 514, 516, and 518.

Referring to FIG. 6, the first down-sampled block generator 102 of the video processor 100 may generate a first down-sampled block 602 by performing down-sampling which reduces a size of a first block 600 down to ¼ according to an exemplary embodiment. A down-sampling method for generating the first down-sampled block 602 may be various and should not be construed as being limited to such an exemplary embodiment.

According to an exemplary embodiment, the second down-sampled block generator 104 of the video processor 100 may perform down-sampling based on a block 611 including some samples in a second block 610 in order to generate a plurality of second down-sampled blocks 612, 614, 616, and 618. That is, the video processor 100 may perform down-sampling based on the block 611 including some samples of the second block 610 in order to down-sample the second block 610. A method of down-sampling the block 611 may be the one described above in FIG. 5, and thus, a detailed description thereof will be omitted. Referring to FIG. 6, the video processor 100 may generate the second down-sampled blocks 612, 614, 616, and 618 by down-sampling the block 611, and a size of each of the generated second down-sampled blocks 612, 614, 616, and 618 may be ¼ a size of the block 611. However, a size ratio between the second down-sampled blocks 612, 614, 616, and 618 generated as a result of down-sampling the block 611 and the block 611 may be various.

Figure 7:
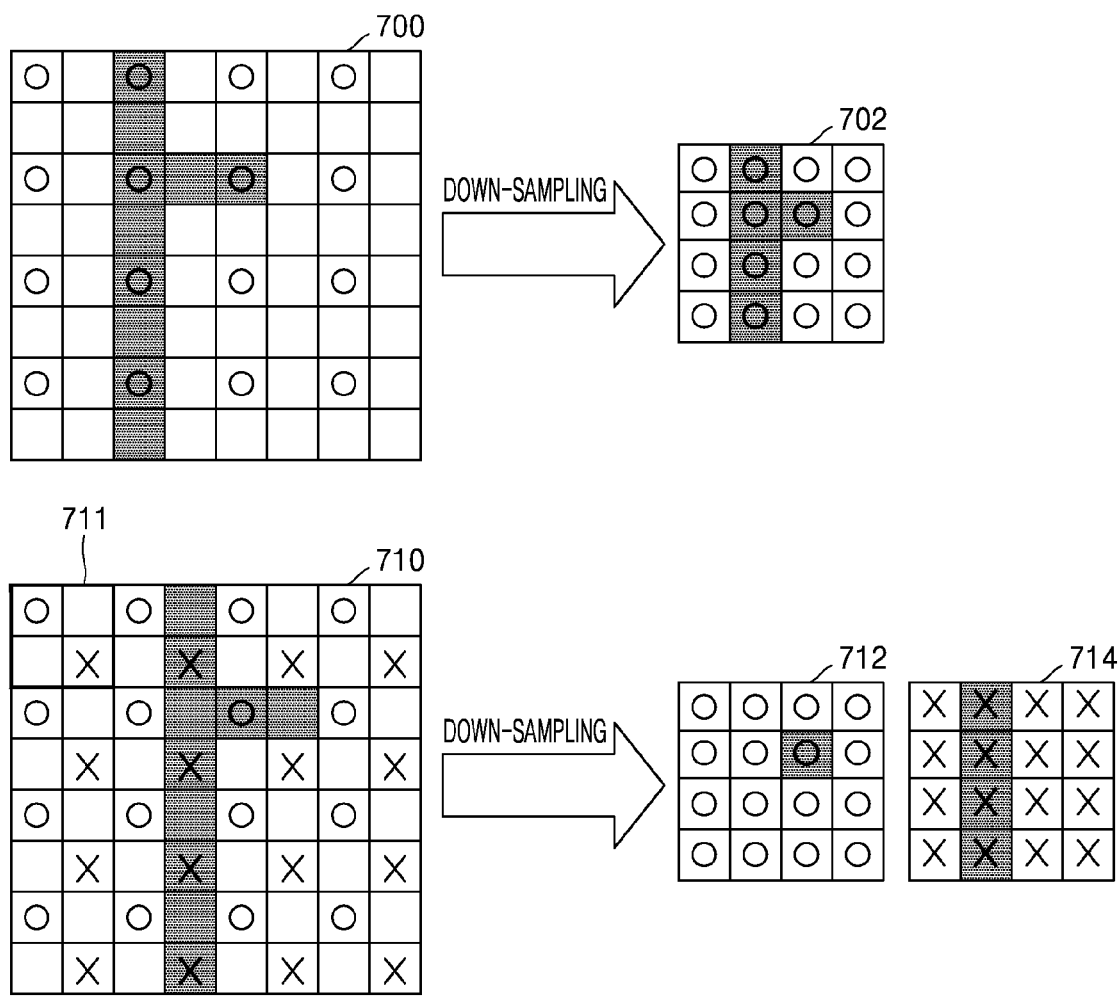
FIG. 7 illustrates another method of generating, by a second down-sampled block generator of a video processor, a second down-sampled block according to an exemplary embodiment.

FIG. 7 illustrates another method of generating, by the second down-sampled block generator 104 of the video processor 100, a second down-sampled block according to an exemplary embodiment.

According to an exemplary embodiment, the first down-sampled block generator 102 of the video processor 100 may generate a first down-sampled block 702 by down-sampling a first block 700. A method of generating the first down-sampled block 702 has been described above in detail through various exemplary embodiments, and thus, a detailed description thereof will be omitted. The second down-sampled block generator 104 may generate a plurality of second down-sampled blocks 712 and 714 by down-sampling a second block 710. According to the above exemplary embodiments, when the second block 710 is down-sampled, all the samples included in the second block 710 are down-sampled in respectively different methods. However, a down-sampling method for generating the second down-sampled blocks 712 and 714, the method described in one exemplary embodiment, may include various methods for generating a plurality of down-sampled blocks.

Referring to FIG. 7, according to an exemplary embodiment, in order to generate the second down-sampled blocks 712 and 714, the second down-sampled block generator 104 may generate each of the second down-sampled blocks 712 and 714 that includes one of four samples in each block having a size of 2×2 in the second block 710.

A block 711 having a size of 2×2 in the second block 710 may include four samples, and the second down-sampled blocks 712 and 714 may each include one of the four samples. For example, the second down-sampled block generator 104 may generate a second down-sampled block 712 including an upper left sample in the block 711 and a second down-sampled block 714 including a lower right sample in the block 711 by down-sampling the second block 710. Likewise, the second down-sampled block generator 104 may generate, based on positions of samples in a block having a size of 2×2 in the second block 710, the second down-sampled blocks 712 and 714 including the samples in the respective positions.

As a result of down-sampling the second block 710 of FIG. 7, the two second down-sampled blocks 712 and 714 have been generated by performing down-sampling using only samples present in certain positions from among the four samples included in the block 711. This may be a different down-sampling method from the method of generating the four second down-sampled blocks 512, 514, 516, and 518 by down-sampling the second block 510 as shown in FIG. 5. Although only the two second down-sampled blocks 712 and 714 are generated instead of the four second down-sampled blocks 512, 514, 516, and 518, a second down-sampled block 512 518 or 714 that is relatively more similar to a first down-sampled block 502 or 702 compared with a second down-sampled block 512 or 712 generated based on a method corresponding to a method of generating the first down-sampled block 502 or 702 may be generated. Accordingly, according to circumstances, despite decreasing the number of a plurality of second down-sampled blocks which are generated by performing down-sampling, the video processor 100 may prevent great performance degradation and thus may efficiently determine a motion vector. However, a down-sampling method for generating the second down-sampled blocks 712 and 714 may include various down-sampling methods for generating a plurality of down-sampled blocks and should not be construed as being limited to such exemplary embodiments.

According to an exemplary embodiment, the number of down-sampling methods which are used to generate a plurality of second down-sampled blocks may be determined based on a size ratio between a second block and a second down-sampled block. For example, referring to FIG. 5, in order to generate the four types of second down-sampled blocks 512, 514, 516, and 518 being ¼ a size of the second block 510, the second down-sampled block generator 104 may perform down-sampling based on positions of the four samples in the block 511 having a size of 2×2. However, a down-sampling method for generating the second down-sampled blocks 512, 514, 516, and 518 may include various down-sampling methods for generating a plurality of down-sampled blocks and should not be construed as being limited to such exemplary embodiments.

Figure 8:
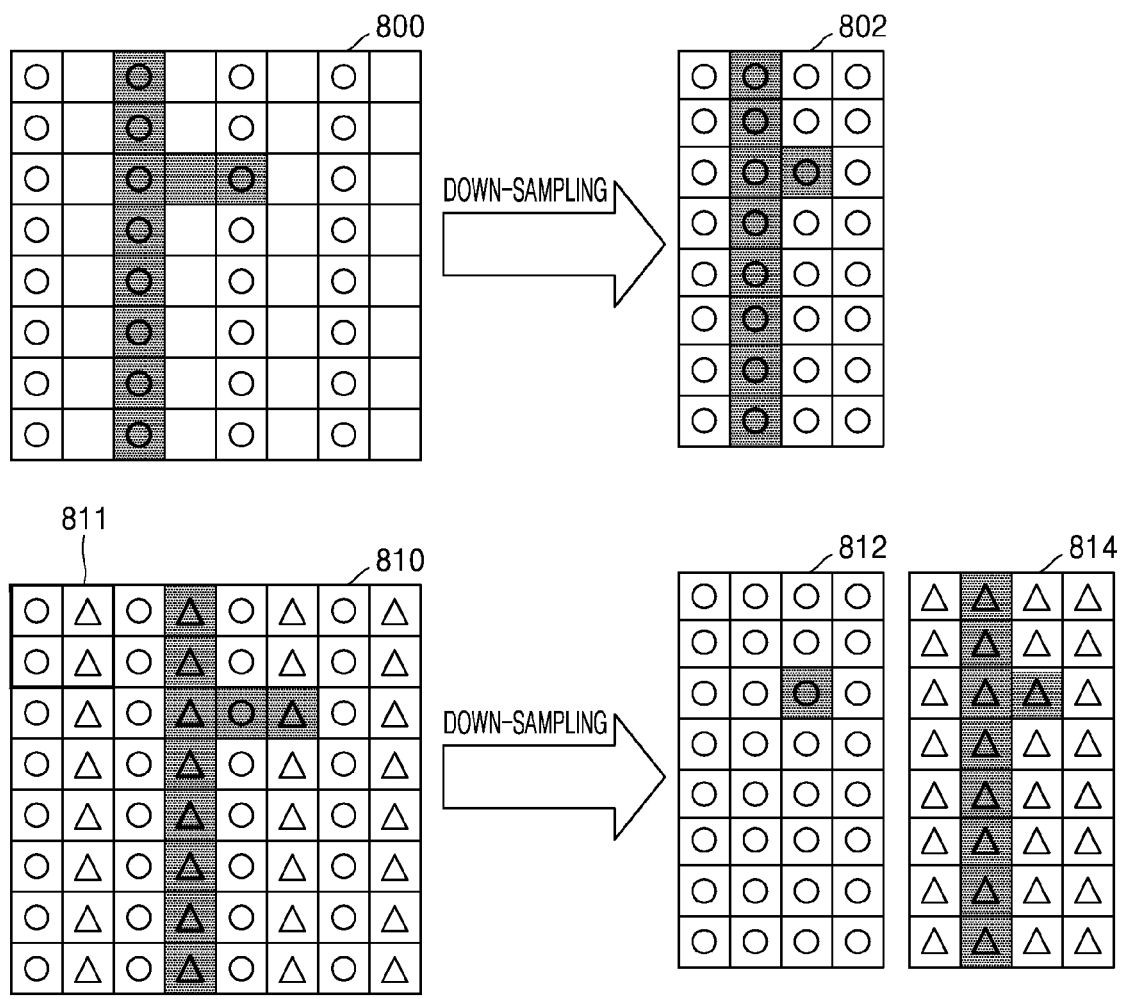
FIG. 8 illustrates determining the number of down-sampling methods capable of being performed by a video processor, based on a size ratio between a down-sampled block that is generated by performing, by the video processor, down-sampling and an original block according to an exemplary embodiment.

FIG. 8 illustrates determining the number of down-sampling methods capable of being performed by the video processor 100, based on a size ratio between a down-sampled block that is generated by performing, by the video processor 100, down-sampling and an original block according to an exemplary embodiment.

According to an exemplary embodiment, the first down-sampled block generator 102 of the video processor 100 may generate a first down-sampled block 802 having a width that is half a width of a first block 800 by down-sampling the first block 800. In order to generate the first down-sampled block 802 having a width reduced to half of the width of the first block 800, the first down-sampled block generator 102 may perform down-sampling by using only samples in odd number columns or even number columns of the first block 800. Referring to FIG. 8, the first down-sampled block generator 102 may generate the first down-sampled block 802 by using only the samples in the odd number columns of the first block 800.

According to an exemplary embodiment, the second down-sampled block generator 104 of the video processor 100 may generate a plurality of second down-sampled blocks 812 and 814 having a width that is half a width of a second block 810 by down-sampling the second block 810. In order to generate the plurality of second down-sampled blocks 812 and 814 having a width reduced to half of the width of the second block 810, the second down-sampled block generator 104 may perform down-sampling by using only samples in odd number columns or even number columns of the second block 810. Referring to FIG. 8, the second down-sampled block generator 104 may generate the second down-sampled block 812 by using only the samples in the odd number columns of the second block 810 and may generate the second down-sampled block 814 by using only the samples in the even number columns of the second block 810. That is, when a size of the second down-sampled blocks 812 and 814 is half a size of the second block 810, the number of the second down-sampled blocks 812 and 814 which may be generated by down-sampling the second block 810 may be two. However, the above down-sampling method is one of various exemplary embodiments for generating at least one down-sampled block having a particular ratio or a particular size, and accordingly, the feature of determining, based on a size ratio between a down-sampled block and an original block, the number of down-sampling methods capable of being performed by the video processor 100 should not be construed as being limited to the above exemplary embodiment.

In operation S204, the video processor 100 may compare the first down-sampled block and each of the plurality of second down-sampled blocks and thus may select one of the second down-sampled blocks.

According to an exemplary embodiment, when the second down-sampled block generator 104 generates the second down-sampled blocks 512, 514, 516, and 518 by down-sampling the second block 510, a second down-sampled block generated by performing down-sampling in a method different from a method of down-sampling the first block 500 may be relatively more similar to the second block 510 than a second down-sampled block generated by performing down-sampling the same as the method of down-sampling the first block 500. Considering that the first block 500 and the second block 510 have samples disposed in a similar manner to each other, when the second down-sampled block 514 most similar to the first down-sampled block 502 is selected, a motion vector whereby the second block 510 points to the first block 500 may be accurately determined. Accordingly, the video processor 100 may select one of the second down-sampled blocks 512, 514, 516, and 518 that is most similar to the first down-sampled block 502. A method of selecting a second down-sampled block that is most similar to the first down-sampled block 502 may be various and should not be construed as being limited to the exemplary embodiments which will be described below.

According to an exemplary embodiment, in order to select one of the second down-sampled blocks 512, 514, 516, and 518 that is most similar to the first down-sampled block 502, the video processor 100 may compare sums of absolute differences (SADs) between the first down-sampled block 502 and the second down-sampled blocks 512, 514, 516, and 518. That is, the video processor 100 may select a second down-sampled block having the least SAD value as a block most similar to the first down-sampled block 502 by comparing the SADs between the first down-sampled block 502 and the second down-sampled blocks 512, 514, 516, and 518. For example, an SAD may be calculated as in Equation 1 below.

$$SAD(i,j,k,l)=\Sigma|B_{cur}(i,j)-B_{ref}(k,l)| \quad \text{[Equation 1]}$$

According to an exemplary embodiment, $B_{cur}$ may be a current block included in the second down-sampled blocks 512, 514, 516, and 518, and $B_{ref}$ may be a reference block included in the first down-sampled block 502. i, j may indicate a position of the current block, and k, l may indicate a position of the reference block.

According to an exemplary embodiment, the video processor 100 may select one of the second down-sampled blocks 612, 614, 616, and 618 by comparing the second down-sampled blocks 612, 614, 616, and 618 generated by down-sampling the block 611 and the first down-sampled block 602. For example, the video processor 100 may select a block that is most similar to the first down-sampled block 602 from among the second down-sampled blocks 612, 614, 616, and 618. The video processor 100 may determine degrees of similarity to the first down-sampled block 602 with respect to the second down-sampled blocks 612, 614, 616, and 618 respectively, and when the degrees of similarity determined with respect to the second down-sampled blocks 612, 614, 616, and 618 respectively are compared, which of the second down-sampled blocks 612, 614, 616, and 618 is most similar to the first down-sampled block 602 may be determined to select one of the second down-sampled blocks 612, 614, 616, and 618.

According to an exemplary embodiment, in order to select one of the second down-sampled blocks 612, 614, 616, and 618 that is most similar to the first down-sampled block 602, the video processor 100 may compare SADs between the first down-sampled block 602 and the second down-sampled blocks 612, 614, 616, and 618. An SAD may be determined based on an equation corresponding to the above Equation 1. According to an exemplary embodiment, $B_{cur}$ may be a current block included in the second down-sampled blocks 612, 614, 616, and 618, and $B_{ref}$ may be a reference block included in the first down-sampled block 602. i, j may indicate a position of the current block, and k, l may indicate a position of the reference block.

In operation S206, the motion vector determiner 106 of the video processor 100 may determine, based on the first down-sampled block and the selected second down-sampled block, a motion vector whereby the second block points to the first block.

Figure 9A:
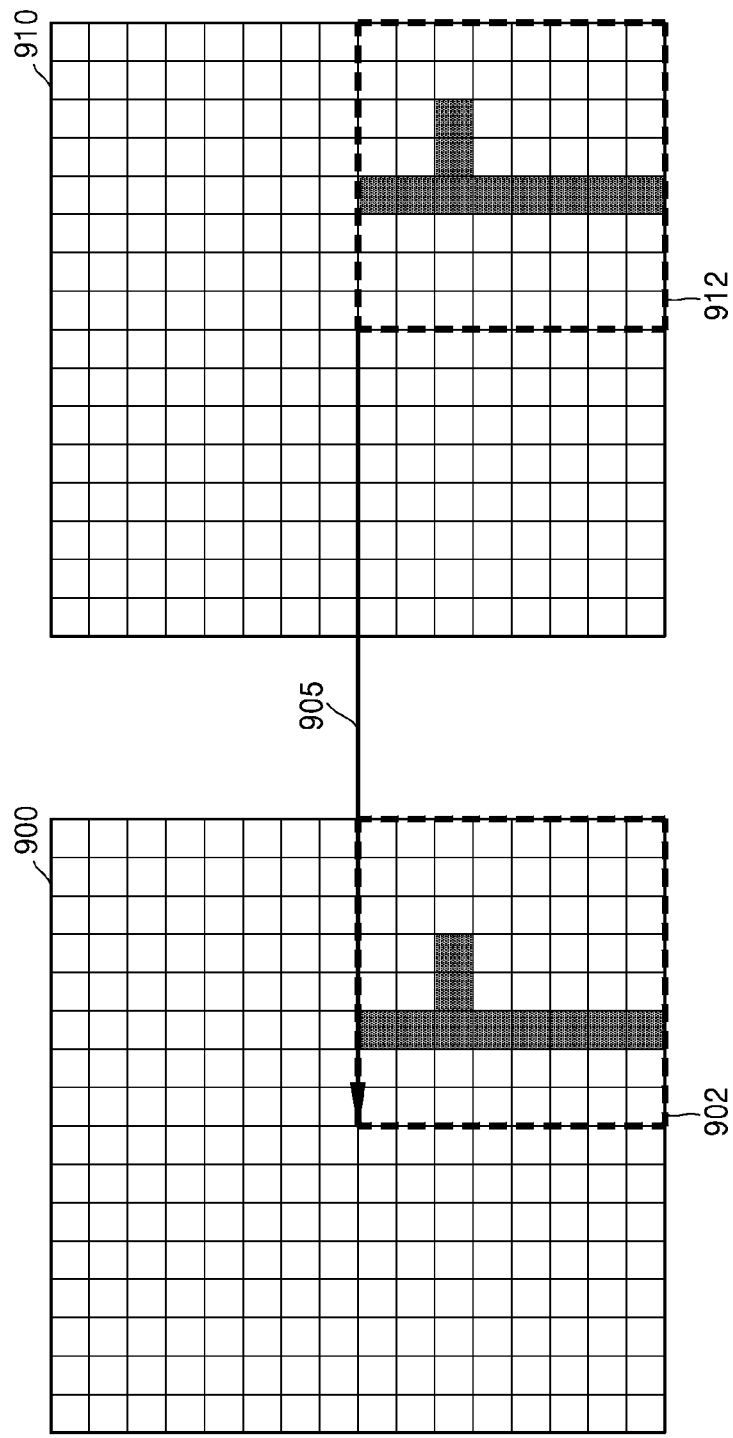

FIGS. 9A and 9B illustrate a process of determining, based on a second down-sampled block selected by the video processor 100, a motion vector whereby a second block points to a first block according to an exemplary embodiment.

According to an exemplary embodiment, in order to restore a second block 912, the video processor 100 may use a block including information similar to that of the second block 912 in a first frame 900 that is a different frame from a second frame 910. In order to determine a block similar to the second block 912 on the first frame 900, a motion vector related to the second block 912 may be determined. The second block 912 may be restored using information of a particular block on the first frame 900 that the motion vector points to. By a second down-sampled block that is selected, from among a plurality of second down-sampled blocks generated by down-sampling the second block 912, as one that is most similar to a first down-sampled block generated by down-sampling the first block 902, a block that is most similar to the second block 912 in the second frame 910 may be determined as the first block 902.

Figure 3:
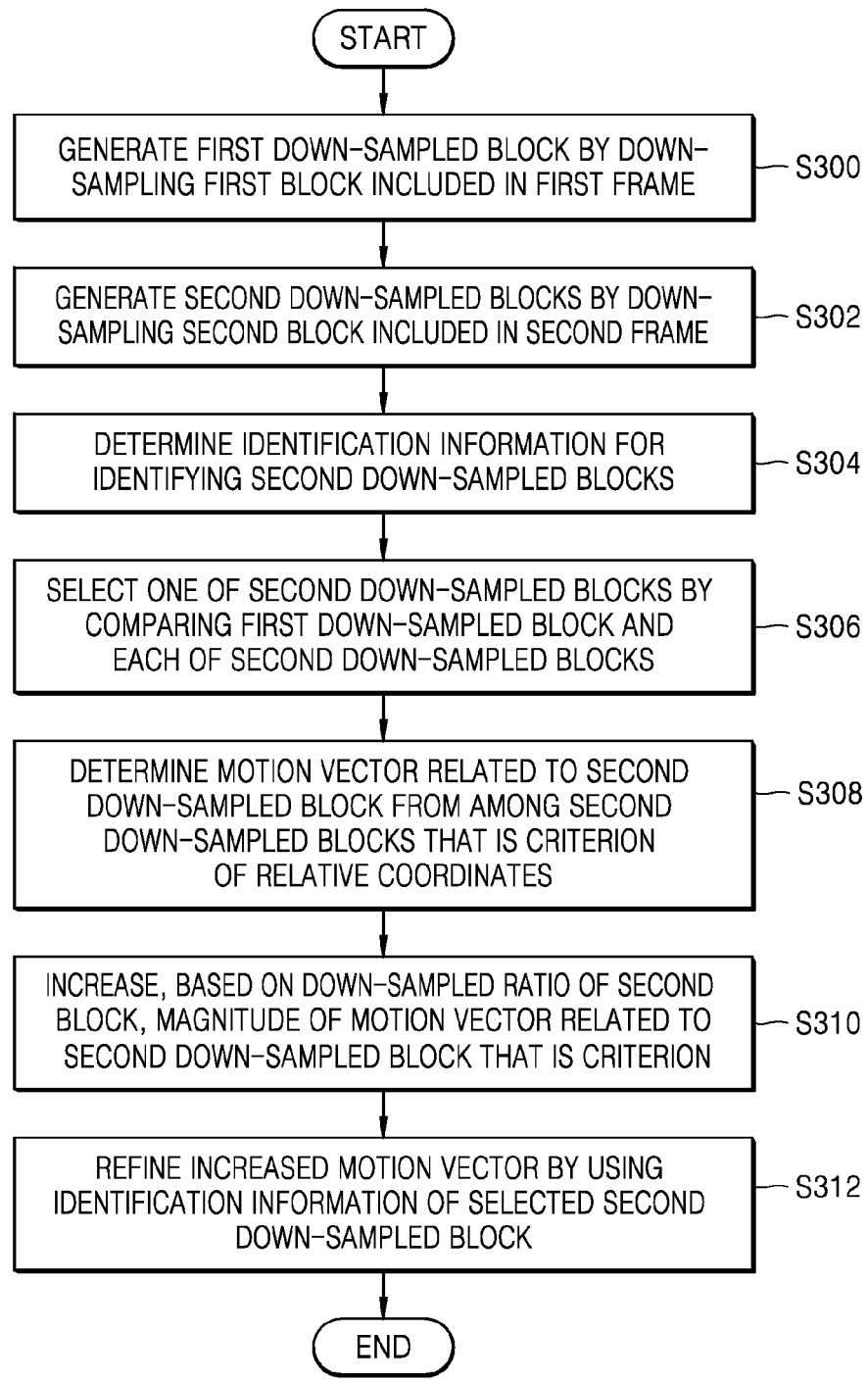
FIG. 3 is a flowchart of a method of determining, by a video processor, a motion vector, based on a down-sampling method of a plurality of second down-sampled blocks according to an exemplary embodiment.

FIG. 3 is a flowchart of a method of determining, by the video processor 100, a motion vector based on a down-sampling method of a plurality of second down-sampled blocks according to an exemplary embodiment.

In operation S300, the video processor 100 may generate a first down-sampled block by down-sampling a first block included in a first frame according to an exemplary embodiment. An operation of the video processor 100 in operation S300 has been described above with reference to operation S200 of FIG. 2, and thus, a detailed description thereof will be omitted.

In operation S302, the video processor 100 may generate a plurality of second down-sampled blocks by down-sampling a second block included in a second frame according to an exemplary embodiment. An operation of the video processor 100 in operation S302 has been described above with reference to operation S202 of FIG. 2, and thus, a detailed description thereof will be omitted.

In operation S304, the video processor 100 may determine identification information for identifying the plurality of second down-sampled blocks according to an exemplary embodiment.

Referring to FIG. 9A, in order to restore a video including the first frame 900 and the second frame 910, at least one block included in each frame may be down-sampled, and a motion vector may be obtained based on the down-sampled block. In detail, the second frame 910 may be split into a plurality of blocks, and with respect to each of the plurality of blocks, a motion vector that points to a block on the first frame 900 that is most similar to each of the blocks may be estimated. When blocks on the first frame 900 and the second frame 910 are compared using down-sampled blocks and are determined as most similar blocks, in order to obtain a motion vector whereby a block on the second frame 910 points to the most similar block on the first frame 900, a vector obtained based on down-sampled blocks has to be up-sampled by taking a down-sampling ratio into account. That is, when a vector is obtained based on down-sampled blocks having widths and lengths that are half widths and lengths of blocks, a motion vector 905 in an original video may be determined by doubling a coordinate value of a vector value obtained to determine the motion vector in the original video. However, this may correspond to only a case where a coordinate value of the motion vector is an even number, and accordingly, in a video including the subject moving as much as an odd number of samples or having a lot of high-frequency components, an accurate motion vector may be difficult to determine.

FIG. 9B illustrates a process of determining, by the video processor 100, a motion vector 955 where a second block 962 that is one of a plurality of blocks splitting a second frame 960 points to a first block 952 on a first frame 950 according to an exemplary embodiment.

According to an exemplary embodiment, the second down-sampled block generator 104 of the video processor 100 may generate a plurality of second down-sampled blocks 970, 972, 974, and 976 including some of a plurality of samples included in the second block 962, and a method of generating the plurality of second down-sampled blocks 970, 972, 974, and 976 has been described in the above various exemplary embodiments, and thus, a detailed description thereof will be omitted.

According to an exemplary embodiment, the video processor 100 may determine identification information for determining the second down-sampled blocks 970, 972, 974, and 976 generated from the second block 962 by the second down-sampled block generator 104. For example, the video processor 100 may determine (0,0) as identification information regarding a second down-sampled block 970 including an upper left sample in a block 964 included in the second block 962, (1,0) as identification information regarding a second down-sampled block 972 including an upper right sample in the block 964, (0,1) as identification information regarding a second down-sampled block 974 including a lower left sample in the block 964, and (1,1) as identification information regarding a second down-sampled block 976 including a lower right sample in the block 964. Such pieces of identification information may be defined with respect to every plurality of second down-sampled blocks 970, 972, 974, and 976 which may be divided according to a method of performing down-sampling in the second block 962 and may be information indicating relative coordinates between the second down-sampled blocks 970, 972, 974, and 976. For example, based on the second down-sampled block 970 having the identification information of (0,0), the second down-sampled block 972 having the identification information of (1,0) may be the one generated by moving as much as one sample in a row direction (or a right direction) compared with a down-sampling method of the second down-sampled block 970 having the identification information of (0,0) and performing down-sampling. As another example, based on the second down-sampled block 970 having the identification information of (0,0), the second down-sampled block 974 having the identification information of (0,1) may be the one generated by moving as much as one sample in a column direction (or in a downward direction) compared with a down-sampling method of the second down-sampled block 970 having the identification information of (0,0) and performing down-sampling.

In operation S306, the video processor 100 may select one of the second down-sampled blocks by comparing the first down-sampled block and each of the second down-sampled blocks. An operation of the video processor 100 in operation S306 has been described above with reference to operation S204 of FIG. 2, and thus, a detailed description thereof will be omitted.

In operation S308, the video processor 100 may determine a motion vector related to a second down-sampled block from among the second down-sampled blocks that is a criterion of relative coordinates.

Referring to FIG. 9B, according to an exemplary embodiment, the second down-sampled blocks 970, 972, 974, and 976 may be blocks related to pieces of identification information respectively corresponding to (0,0), (1,0), (0,1), and (1,1). In this regard, the identification information (0,0) of the second down-sampled block 970 from among the down-sampled blocks 970, 972, 974, and 976 may be a criterion of relative coordinates related to pieces of identification information. The motion vector determiner 106 may determine a motion vector related to the second down-sampled block 970 selected as the criterion. For example, a motion vector related to the second down-sampled block 970 corresponding to the identification information (0,0) selected as the criterion may be determined.

According to an exemplary embodiment, the second down-sampled block 970 from among the second down-sampled blocks 970, 972, 974, and 976 that is obtained by performing down-sampling in a method corresponding to a method of down-sampling a first block 954 may be determined as a second down-sampled block that is a criterion of relative coordinates. For example, when the first block 954 and the second block 962 are blocks having the same size, and the video processor 100 generates down-sampled blocks by down-sampling each of the blocks in the same method, a down-sampled block regarding the second block 962 may be determined as a second down-sampled block that is a criterion of relative coordinates for determining a motion vector that points to the first block 954. Hereinafter, with regard to FIG. 9B, descriptions will be made for convenience of description on the assumption that the second down-sampled block 970 has been determined as a second down-sampled block that is a criterion of relative coordinates. However, a method of setting the second down-sampled block that is the criterion should not be construed as being limited to the above exemplary embodiment and may include various methods of making selection based on one of a plurality of second down-sampled blocks which may be used in various exemplary embodiments.

Referring to FIG. 5, according to an exemplary embodiment, the first down-sampled block generator 102 and the second down-sampled block generator 104 of the video processor 100 may respectively generate the first down-sampled block 502 and the second down-sampled blocks 512, 514, 516, and 518. The down-sampled blocks generated through such a process may be ¼ a size of original blocks before being down-sampled. According to an exemplary embodiment, a motion vector of a second down-sampled block may be determined based on a down-sampled frame obtained by reducing an original frame at the same ratio as a down-sampled block obtained by down-sampling an original block.

In operation S310, according to an exemplary embodiment, the video processor 100 may increase, based on a down-sampling ratio of the second block, a magnitude of the motion vector related to the second down-sampled block that is the criterion. Referring to FIG. 5, according to an exemplary embodiment, a magnitude of a motion vector whereby the second down-sampled blocks 512, 514, 516, and 518 which are down-sampled blocks point to the first down-sampled block 502 may be half a magnitude of a motion vector whereby the second block 510 which is an original block points to the first block 500. In this case, a motion vector of the second down-sampled block 970 corresponding to the identification information (0,0) selected as the criterion may be increased to double. A coordinate value regarding the vector value increased as such may have only even number values. Accordingly, when only an up-scaled vector is used in motion estimation, in the case where the subject that moves as much as an odd number of samples is included in a frame, accuracy of a motion vector of the second block 510 may degrade. Accordingly, the increased vector value needs to be refined using information regarding the second down-sampled blocks 512, 514, 516, and 518 related to the second block.

In operation S312, the video processor 100 may refine the increased motion vector by using identification information of the second down-sampled block selected in operation S306.

According to an exemplary embodiment, the video processor 100 may select the second down-sampled block 972 having the identification information of (1,0) as the most similar block to a block obtained by down-sampling the first block 954 and may refine the increased motion vector by using a motion vector by using the identification information related to the selected second down-sampled block 972.

Referring to FIG. 9B, according to an exemplary embodiment, the video processor 100 may select identification information of the second down-sampled block 970 from among the second down-sampled blocks 970, 972, 974, and 976 as a criterion of a relative coordinate indicated by each identification information. The video processor 100 may select, from among the second down-sampled blocks 970, 972, 974, and 976 related to the second block 962, the second down-sampled block 972 having the identification information of (1,0) as the most similar block to a block obtained by down-sampling the first block 954. A method of selecting the second down-sampled block 972 having the identification information of (1,0) as the most similar block to the block obtained by down-sampling the first block 954 has been described through the above various exemplary embodiments, and thus, a detailed description thereof will be omitted.

According to an exemplary embodiment, the second down-sampled block 972 having the identification information of (1,0) may be selected as the most similar block to the block obtained by down-sampling the first block 954, and the motion vector determiner 106 of the video processor 100 may refine the vector value increased by the video processor 100 in operation S310 by using the identification information (1,0) related to the selected second down-sampled block 972. For example, when a coordinate value of a vector has only even number values as a vector value increases, accuracy of a motion vector may degrade, and accordingly, the motion vector determiner 106 of the video processor 100 may refine the motion vector so as to be determined not only as an even number value but also as an odd number value by using identification information related to the second down-sampled blocks.

According to an exemplary embodiment, the motion vector determiner 106 of the video processor 100 may refine a motion vector of the second down-sampled block 970 selected as a down-sampled block that is a criterion of a relative coordinate indicated by identification information, by using the identification information (1,0) of the second down-sampled block 972 selected as the most similar block to the block obtained by down-sampling the first block 954.

The motion vector determiner 106 may determine an increased vector value by increasing, based on a down-sampling ratio, a motion vector value (for example, (x,y)) where the second down-sampled block 970 points to the block obtained by down-sampling the first block 954. For example, when the second down-sampled blocks 970, 972, 974, and 976 are generated by down-sampling the second block 962 so as to be ½ a size of a width and length of the second block 962, the increased vector value may be determined as (2x, 2y). The increased vector value may be refined using the identification information (1,0) of the second down-sampled block 972 selected as the most similar block to the block obtained by down-sampling the first block 954 and may be refined to have an odd number value as a result of refinement. For example, an increased vector value (2x, 2y) may be refined using the identification information (1,0) of the second down-sampled block 972, and thus, a motion vector having a value of (2x−1, 2y) may be determined. As the increased vector value (2x, 2y) where the second block 962 points to the first block 954 is refined, the motion vector determiner 106 of the video processor 100 may change, by using a refined motion vector (2x−1, 2y) (for example, 955), a block to which a motion vector of the second block 962 points to the first block 952 having its position changed. As a block on the first frame 950 that the second block 962 points changes to the first block 952, the video processor 100 may relatively accurately determine a block similar to the second block 962 on the first frame 950. However, a method of generating, through down-sampling, the second down-sampled blocks 970, 972, 974, and 976 having a reduced size of the width and length of the second block 962 may be various. Accordingly, a size of the width and length may be reduced down to 1/n, and in this case, the increased vector value may be determined as (nx, ny).

That is, the second down-sampled block 972 selected as the most similar block to the block obtained by down-sampling the first block 954 may be the one generated by performing down-sampling with samples in the second block 962 that are located right as much as one sample from the second down-sampled block 970 that is the criterion. Thus, the vector value may be decreased as much as the identification information (1,0) so as to point to a block located left as much as one sample from the vector value (2x, 2y) generated by increasing a vector value where the second down-sampled block 970 that is the criterion points to the block generated by down-sampling the first block 954.

According to one or more of the above exemplary embodiments, a motion estimation method having a lower complexity than a motion vector estimation method of the related art may be used, and an accurate motion vector may be estimated regarding a high-frequency area of a high-resolution video.

The inventive concept may be embodied as computer-readable codes on a non-transitory computer-readable recording medium. The non-transitory computer-readable recording medium includes any storage device that may store data which may be read by a computer system.

The computer-readable codes are configured to perform operations of implementing an object arrangement method according to one or more exemplary embodiments when read from the non-transitory computer-readable recording medium by a processor and executed. The computer-readable codes may be embodied as various programming languages. In addition, functional programs, codes, and code segments for embodying exemplary embodiments described herein may be easily derived by programmers in the technical field to which the inventive concept pertains.

Examples of the non-transitory computer-readable recording medium include read-only memory (ROM), random-access memory (RAM), CD-ROMs, magnetic tapes, floppy disks, and optical data storage devices. The non-transitory computer-readable recording medium may be distributed over network-coupled computer systems so that the computer-readable codes are stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A video processing method comprising:
generating a first down-sampled block by down-sampling a first block included in a first frame;
generating a plurality of second down-sampled blocks by down-sampling a second block included in a second frame;
selecting one of the plurality of second down-sampled blocks by comparing the first down-sampled block and each of the plurality of second down-sampled blocks; and
determining, based on the first down-sampled block and the one selected second down-sampled block, a motion vector whereby the second block points to the first block,
wherein the plurality of second down-sampled blocks are generated using down-sampling methods that are different from each other with respect to samples of the second block,
wherein each block of the plurality of the second down-sampled blocks includes a plurality of samples,
wherein the plurality of samples in a same second down-sampled block have a same relative position within each of a plurality of different subblocks,
wherein the plurality of different subblocks, which are different from the second down-sampled blocks, are in the second block, and each of the subblocks has the plurality of samples that have a same relative position within each block of a plurality of different second down-sampled blocks,
wherein each of the plurality of different subblocks includes a plurality of adjacent samples in the second block and each block of the plurality of the second down-sampled blocks includes a plurality of samples from among samples in the second block, and
wherein the plurality of samples in a same second down-sampled block are separated from each other by at least one sample distance in the second block.

2. The method of claim 1, further comprising determining identification information for identifying the plurality of second down-sampled blocks,
wherein the determining of the motion vector comprises determining, based on identification information of the one selected second down-sampled block, the motion vector.

3. The method of claim 2, wherein the identification information indicates relative coordinates between the plurality of second down-sampled blocks, and
the determining of the motion vector further comprises determining a motion vector related to a second down-sampled block from among the plurality of second down-sampled blocks, wherein the second down-sampled block is a criterion of the relative coordinates.

4. The method of claim 3, wherein the determining of the motion vector further comprises:
increasing, based on a down-sampling ratio of the second block, a magnitude of the motion vector related to the second down-sampled block that is the criterion; and
refining the increased motion vector by using the identification information of the one selected second down-sampled block.

5. The method of claim 3, wherein the determining of the motion vector related to the second down-sampled block that is the criterion comprises determining, as the second down-sampled block that is the criterion, a second down-sampled block from among the plurality of second down-sampled blocks that is generated based on a down-sampling method used in a process of generating the first down-sampled block.

6. The method of claim 1, wherein the down-sampling is a method of generating a block having a reduced size in at least one of a widthwise direction and a lengthwise direction.

7. The method of claim 1, wherein a number of the down-sampling methods that are used to generate the plurality of second down-sampled blocks is determined based on a size ratio between the second block and the plurality of second down-sampled blocks.

8. The method of claim 1, wherein the one selected second down-sampled block is determined based on a sum of absolute differences (SAD) that indicates information related to a difference between the first down-sampled block and the plurality of second down-sampled blocks.

9. A non-transitory computer-readable recording medium having recorded thereon a program for implementing the video processing method of claim 1.

10. The method of claim 1, wherein the subblock and the second down-sampled block have different block sizes.

11. A video processor comprising at least one processor configured to:
generate a first down-sampled block by down-sampling a first block included in a previous frame that is different from a current frame;
generate a plurality of second down-sampled blocks by down-sampling a second block included in the current frame; and
select one of the plurality of second down-sampled blocks by comparing the first down-sampled block and each of the plurality of second down-sampled blocks and determine, based on the first down-sampled block and the one selected second down-sampled block, a motion vector whereby the second block points to the first block,
wherein the plurality of second down-sampled blocks are generated using down-sampling methods that are different from each other with respect to samples of the second block,
wherein each block of the plurality of the second down-sampled blocks includes a plurality of samples,
wherein the plurality of samples in a same second down-sampled block have a same relative position within each of a plurality of different subblocks,
wherein the plurality of different subblocks, which are different from the second down-sampled blocks, are in the second block, and each of the subblocks has the plurality of samples that have a same relative position within each block of a plurality of different second down-sampled blocks, and
wherein each of the plurality of different subblocks includes a plurality of adjacent samples in the second block and each block of the plurality of the second down-sampled blocks includes a plurality of samples from among samples in the second block, and wherein the plurality of samples in a same second down-sampled block are separated from each other by at least one sample distance in the second block.

12. The video processor of claim 11, wherein the at least one processor is further configured to determine identification information for identifying the plurality of second down-sampled blocks and determine, based on identification information of the one selected second down-sampled block, the motion vector.

13. The video processor of claim 12, wherein the identification information indicates relative coordinates between the plurality of second down-sampled blocks, and the at least one processor is further configured to determine a motion vector related to a second down-sampled block from among the plurality of second down-sampled blocks, wherein the second down-sampled block is a criterion of the relative coordinates.

14. The video processor of claim 13, wherein the at least one processor is further configured to:

increase, based on a down-sampling ratio of the second block, a magnitude of the motion vector related to the second down-sampled block that is the criterion; and refine the increased motion vector by using the identification information of the one selected second down-sampled block.

15. The video processor of claim 13, wherein the at least one processor is further configured to determine, as the second down-sampled block that is the criterion, a second down-sampled block from among the plurality of second down-sampled blocks that is generated based on a down-sampling method used in a process of generating the first down-sampled block.

16. The video processor of claim 11, wherein the down-sampling is a method of generating a block having a reduced size in at least one of a widthwise direction and a lengthwise direction.

17. The video processor of claim 11, wherein a number of the down-sampling methods that are used to generate the plurality of second down-sampled blocks is determined based on a size ratio between the second block and the plurality of second down-sampled blocks.

18. The video processor of claim 11, wherein the at least one processor is further configured to determine, based on a sum of absolute differences (SAD) that indicates information related to a difference between the first down-sampled block and the plurality of second down-sampled blocks, the one selected second down-sampled block.

* * * * *